United States Patent [19]

Stulen et al.

[11] Patent Number: 4,869,233
[45] Date of Patent: Sep. 26, 1989

[54] BOILING CONDITION DETECTOR

[75] Inventors: Foster B. Stulen; Douglas B. Pape; William J. Williams, all of Columbus, Ohio

[73] Assignee: Gas Research Institute, Chicago, Ill.

[21] Appl. No.: 126,897

[22] Filed: Nov. 30, 1987

[51] Int. Cl.⁴ ............................................. A47J 27/62
[52] U.S. Cl. ..................................... 126/374; 126/351; 126/388; 99/331; 340/540; 340/603; 73/587
[58] Field of Search ....................... 126/374, 351, 388; 73/590, 587; 340/540, 603, 526; 99/331

[56] References Cited

U.S. PATENT DOCUMENTS

| | | | |
|---|---|---|---|
| 2,757,869 | 8/1956 | Ray | 126/351 X |
| 3,828,164 | 8/1974 | Fischer et al. | 219/431 |
| 4,140,021 | 2/1979 | Nomura et al. | 73/587 |
| 4,465,228 | 8/1984 | Mori et al. | 126/374 X |
| 4,481,409 | 11/1984 | Smith | 219/432 |
| 4,508,261 | 4/1985 | Blank | 126/374 X |
| 4,622,202 | 11/1986 | Yamada et al. | 73/861.11 X |

FOREIGN PATENT DOCUMENTS

| | | | |
|---|---|---|---|
| 0153036 | 9/1983 | Japan | 126/351 |
| 0160739 | 9/1983 | Japan | 126/374 |
| 2143053 | 1/1985 | United Kingdom | 126/374 |

*Primary Examiner*—Robert E. Garrett
*Assistant Examiner*—Carl D. Price
*Attorney, Agent, or Firm*—Watkins, Dunbar & Pollick

[57] ABSTRACT

Apparatus and methods are disclosed for acoustically detecting different conditions of boiling occurring within a liquid and developing useful control signals correlated to the detected boiling condition. Distinctions are made between no-boiling, sub-cooled boiling, and full or rolling boiling conditions.

26 Claims, 3 Drawing Sheets

TRUTH TABLE

| A | B | STATE |
|---|---|---|
| F | F | NO BOIL |
| T | X | SUBCOOLED BOIL (PULSE PROCESS) |
| F | T | ROLLING BOIL (CONTINUOUS PROCESS) |

CODE: T: TRUE
F: FALSE
X: DON'T CARE

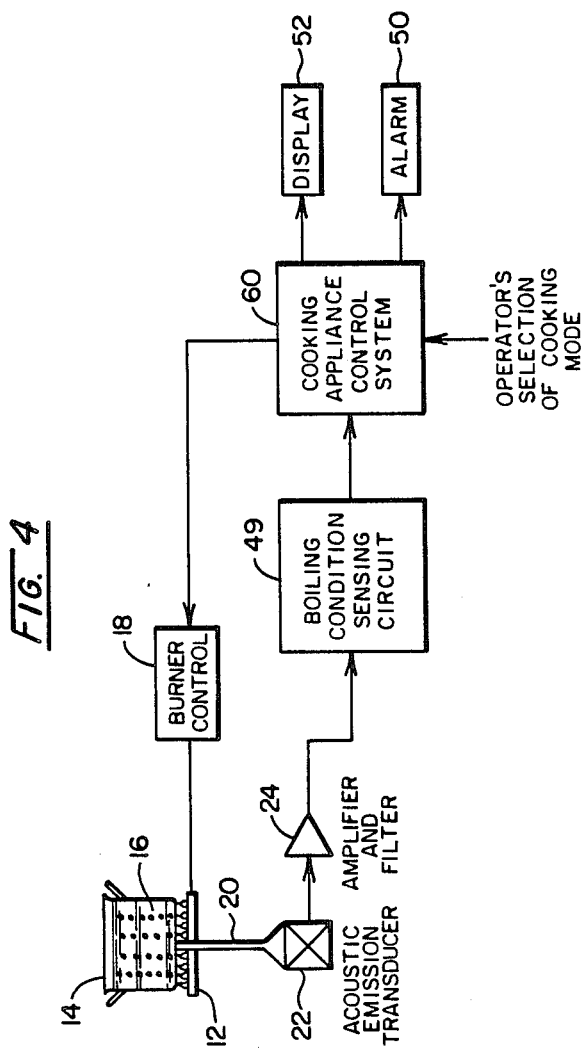

BOILING CONDITION DETECTOR

TECHNICAL FIELD

This invention relates generally to thermodynamic instrumentation. It particularly concerns the detection of whether a fluid is boiling, and, if it is boiling, the detection of the conditions or degree of boiling. The invention monitors the number and/or amplitude of acoustic energy emission events produced by the liquid during or at onset of boiling to determine the conditions of boiling.

BACKGROUND

Boiling of liquids occurs in numerous industries including chemical processing, electric power generation, and food preparation. As heat is applied to the surface of a vessel containing a liquid, the temperature of the liquid rises to the saturation temperature or boiling temperature of the liquid. When the liquid as a whole is slightly below the saturation temperature, a thin layer of liquid near the heated surface can rise above the saturation temperature and initiate boiling. Bubbles of vapor will form in the liquid, but they collapse when they travel to the cooler portion of the liquid. The boiling process when the bulk liquid is below the saturation temperature is termed "subcooled boiling." (For purposes of this discussion the term simmering will be defined as the condition when a liquid is at or on the verge of subcooled boiling.) When the temperature of substantially all of the liquid reaches the saturation point, vapor bubbles will rise to the liquid surface. This process is termed "nucleate boiling," or, more commonly, "full boiling," or "rolling boiling."

In steam generation plants, the boiling conditions are generally determined by measuring the pressure and temperature of the fluid and comparing the measurements to standard operating conditions of the plant. In batch chemical reactors boiling conditions are not as easily determined. Temperature measurement alone is insufficient as a boiling condition detector because a fluid at its saturation temperature can be boiling or condensing. A pressure measurement may not be available if product gasses are vented. An acoustic boiling detector that can determine the condition of boiling independently of temperature and pressure measurements would be useful in these reactors.

Concerning the particular application of cooking appliances, different apparatus and methods have been proposed for detecting the cooking conditions in such appliances. These apparatus typically include a means for controlling the rate of heating of cooking appliance surface units, such as natural gas burners or electrical elements, in response to particular detected cooking conditions. U. S. Pat. No. 3,828,164 to Fischer et al., for instance, proposes detecting the steam of boiling water and generating and transmitting a control signal by radio in response to detection of the steam-generating cooking condition. The invention has the limitation that a sensor must be placed above the cooking vessel. This entails a specialized lid for the cooking vessel, with associated expense and cleaning difficulties. Furthermore, the invention can detect only whether the liquid being cooked is producing steam; it cannot detect when subcooled boiling is in process.

U. S. Pat. No. 4,481,409 to Smith proposes the use of weight detection and rate of weight loss computation methods for controlling the rate of heating of an electrical surface unit in a cooking appliance. This invention provides a means only for inferring the cooking or boiling conditions from the rate of weight loss, but the sensing method cannot operate properly if the cooking vessel is covered by a lid, preventing the evaporating steam from escaping. Furthermore, the weight loss at a simmer condition is minimal, and this invention is ineffective in detecting this condition.

To overcome equipment and processing limitations associated with the known prior art, we have discovered that acoustic energy emission detection techniques and appropriate signal processing may be advantageously utilized to detect thermodynamic conditions such as no boiling, subcooled boiling, and full boiling. The detector we have invented can be used to inform an operator of the current boiling conditions, or to activate a control system to maintain or change boiling conditions.

SUMMARY OF THE INVENTION

The present invention utilizes apparatus such as a solid metal waveguide and a piezoelectric transducer for detecting acoustic energy emissions associated with certain boiling conditions of a liquid and generating corresponding electrical signals. The electrical output piezoelectric transducer is subjected to various detection, conversion, and signal processing operations to determine the boiling condition of the liquid. An electronic circuit is provided to develop a control signal suitable for a fuel flow or power level control apparatus or for an alarm or indicator to inform a human operator of detected boiling condition.

From a method standpoint the present invention acoustically detects individual bubbles in a liquid by sensing bursts of acoustic energy (events) produced by the bubbles. The timing and amplitude of the acoustic events associated with the bubbles are indicative of boiling condition of the liquid. A continuous or nearly continuous acoustic signal is indicative of a full boil or rolling boil condition, where the entire liquid medium has been heated to the saturation temperature or boiling temperature. A series of discrete acoustic events is indicative of subcooled boiling, where the liquid is below the saturation temperature but localized regions of the liquid occasionally boil and produce bubbles of vapor. A period of little or no acoustical activity is indicative of a no-boiling condition.

A specific application of this invention is cooking appliance control. The method utilizes the acoustically detected cooking condition information for changing the rate of heating of particular surface units of a cooking appliance.

DESCRIPTION OF THE DRAWINGS

FIG. 4 is a functional block diagram of a particular embodiment of the present invention, where it is used with a control system for a cooking appliance.

DETAILED DESCRIPTION

Figure 1:
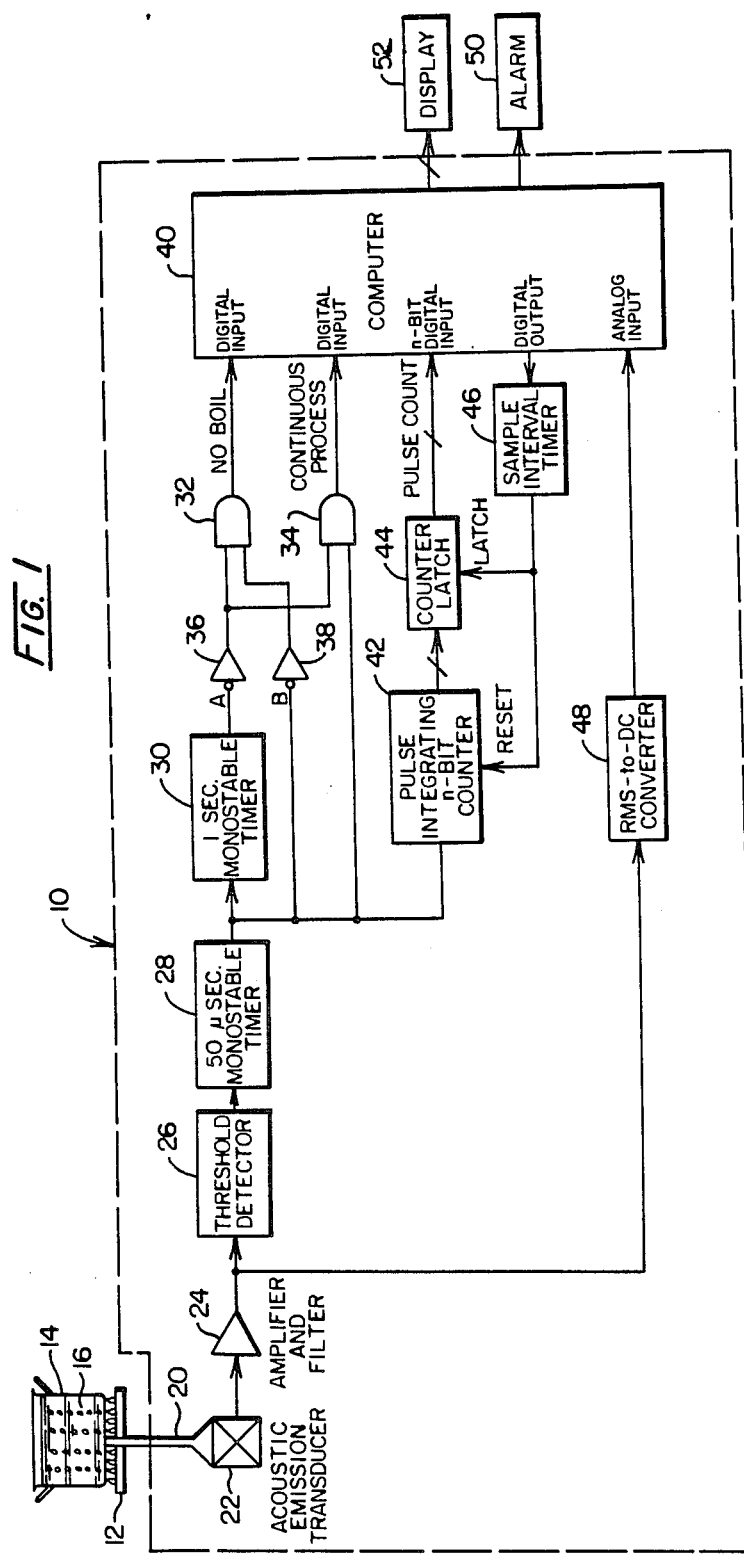
FIG. 1 is a schematic functional block diagram of apparatus utilized in the practice of the present invention.

A preferred embodiment of our invention is designated generally as 10 in FIG. 1 of the drawings. As shown in that figure, a heat source unit 12, in the form of a natural gas burner, is utilized to heat container 14 containing the liquid designated 16.

A solid metal waveguide 20 is arranged to contact the underside of container 14 and preferably is urged into that contacting relationship by a spring means which is not shown. Acoustic emissions from liquid 16 are conducted by waveguide 20 to piezoelectric transducer 22 and converted into corresponding electrical signals. The purpose of waveguide 20 is to protect transducer 22 from the high temperature of container 14. In cases where transducer 22 can withstand the temperature of vessel 14, waveguide 20 may not be necessary.

The electrical signals from function 22 are conducted to amplifier and filter 24 prior to subsequent processing. The filter pass band is chosen to exclude low-frequency noise produced by mechanical disturbances to the container 14. The pass band must extend high enough to include the signal components generated by boiling. The primary frequency range of the boiling signals depends on a number of factors including the viscosity of liquid 16. It is also important that the filter pass band encompass the primary frequency of the transducer's response to boiling. A frequency range of 0.5 kHz to 500 kHz meets most applications, but a range of 5 kHz to 50 kHz is preferable if the liquid 16 is water. The signals from amplifier and filter 24 are then subsequently processed.

Figures 2, 3:
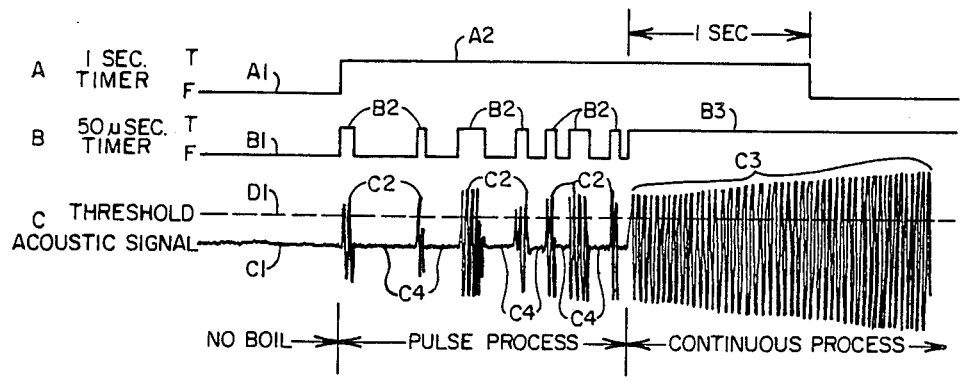
FIG. 2 illustrates various acoustical and digital logic waveforms that may be developed during the use of the apparatus of FIG. 1.
FIG. 3 is a truth table for the digital logic associated with the apparatus of FIG. 1.

FIG. 2 illustrates various waveforms A through C associated with the acoustic emissions of liquid 16 and with the outputs of logic timers 28 and 30 that may be employed in distinguishing (identifying) the various types of waveform C activity. As shown in the lowermost waveform C of FIG. 2, the acoustic emissions of liquid 16 varY from a C1 no boil condition which is indicated by no acoustic emission detected at liquid 16. A pulse process or equivalent of subcooled boiling is first detected by waveguide 20 and converted to an electrical signal at transducer 22. As shown in FIG. 2 the acoustic emission at the pulsed process or subcooled boiling condition is in the form of randomly. spaced individual bursts of activity which occur in the groups designated C2. The waveform C3 next generated at liquid 16 and conducted to transducer 22 and amplifier 24 is a continuous process indicative of rolling or full-boil, which has signal peaks that are all above the indicated threshold level D.

The key feature of the herein described invention is that two characteristics of the acoustically emitted signal from liquid 16 are monitored to distinguish between two phases of boiling: subcooled boiling and full boiling. When a liquid begins to boil or "simmers," individual bubbles form and are released from the bottom of the container and collapse as they reach cooler liquid above the bottom surface. Such events are detected as individual bursts of activity. When there is a full boil, the number of bubbles forming and collapsing causes the signal to take on a continuous random appearance due to the superposition of many individual events.

When there is no boiling, the output signal level of transducer 22 is quite low and therefore a no boiling condition can easily be distinguished from a boiling condition. Conversely, mechanical impacts to the container such as mixing with a spoon generate very large signals. Such signals can be distinguished and during that period all processing is suspended to eliminate this interference.

The differentiation between subcooled boiling and full boiling is based on the division of a signal into a pulse transient process and a continuous process.

In situations where the contents of container 14 are at a full boil, the output of the RMS-to-DC converter 48 is a measure of the rate or degree of boiling and can be used to make adjustments in the rate of heating determined by microprocessor 40. In situations where the contents of container 14 are at a subcooled boil, the rate of occurrence of acoustic events (as determined by pulse counter latch 44 in the representative circuit) is a measure of the rate or degree of subcooled boiling.

The differentiation between the various acoustic signal conditions and the measurement of the level of the boiling condition can be affected by any number of implementations, including digital or analog electronic circuitry. The implementation using digital electronic components depicted in FIG. 1 and described herein is presented as a representative implementation.

The output of amplifier and filter 24 is processed in two manners. The first manner is performed to determine what boiling condition is present. The second manner is optionally performed in the case of subcooled boiling or full boiling, when it is desired to measure the rate of boiling.

The boiling condition is determined by analyzing the acoustic signals as follows. The signal from amplifier and filter 24 is connected to threshold detector 26 and from there to the 50-microsecond monostable timer designated 28. The timer 28 produces a pulse B2 of 50 microseconds duration commencing each time threshold detector 26 senses that the electrical signal has crossed the predetermined threshold. If timer 28 is triggered by threshold detector 26 a second time while the output of timer 28 is still true (high), then the duration of the pulse B2 will be extended. If the acoustic signal is nearly continuous (C3), such that the output of threshold detector 26 comprises a number of closely spaced pulses, then the output of timer 28 will be (B3) continuously true. The response of timer 28 to a representative acoustic signal C is shown as signal B comprised signals B1, B2, and B3 in FIG. 2. Groups C2 are separated by time periods C4 which are of different time duration and in which acoustic activity does not exceed threshold level D. The output signal from timer 28 is processed in several ways including using a one-second monostable timer 30. Timer 30 is triggered by a positive-going output signal change from time 28; when the output of timer 28 changes from false (low) to true, timer 20 produces a pulse A2 of at least one second. If timer 30 is re-triggered by timer 28 when the output of timer 30 is true, then the duration of the output pulse A2 of timer 30 will be extended; but, when the output of timer 28 remains on continuously, timer 30 will not be retriggered and its output will go false one second after the last state change of timer 28. The response of timer 30 to a representative output of timer 28 is shown as signal A in FIG. 2. Timers 28 and 30 preferably take the form of retriggerable one-shot devices.

The truth table in FIG. 3 shows how the outputs of timers 28 and 30 can be used to determine the condition of boiling. Apparatus 20 includes AND gates 32 and 34 and inverters 36 and 38 to perform the logic specified in FIG. 3. AND gate 32 processes the output signal of timer 30 after inverting at inverter 36 and the output signal of timer 28 after inverting at inverter 38. The output signal of AND gate 32 will be true when both signals A and B are false, indicating a no-boiling condition in liquid 16. AND gate 34 processes the output signal of timer 28 and the output signal of timer 30, after inverting at inverter 36. The output signal of AND gate 34 will be true when the signal B is true but signal A is false, indicating a full boil condition. A subcooled boiling condition is indicated when the output of timer 30 is true, regardless of the state of timer 28.

Once it has been determined that the liquid 16 is boiling and which boiling condition (either subcooled or full boil) is present, it may be desirable to process the acoustic signal further to determine the degree of boiling within the detected condition. For subcooled boiling, this is done by measuring the frequency of occurrence of the discrete acoustic emission event groups (B2); for full boiling, by measuring the root-mean-square (RMS) amplitude of the continuous (B3) signal comprised of signals A1 and A2. A C3 representative implementation using digital electronic components to perform these functions is depicted as part of FIG. 1 and described below.

The output of timer 28 is connected to counter 2 and utilized in the development of a subcooled boiling rate signal in computer 40. The output of pulse integrating counter 42 is connected to counter latch 44, and afterwards the output of latch 44 is connected to computer 40. A sample interval timer 46 is controlled by a digital output from computer 40 and functions to latch the pulse integrating counter 42 value in the counter latch 44 and to reset pulse counter 42. As later discussed, it may be desirable to declare the subcooled boiling condition to be represented by a rate of about one to ten energy burst groups B2 per second.

The apparatus of FIG. 1 also includes an RMS-to-DC converter 48 whose input is the signal from amplifier 24. Converter 48 produces an output signal that is fed to computer 40 and is a measure of the amplitude of the acoustic emission envelope detected at container 14 by waveguide 20. As previously indicated, the output of converter 48 may be utilized to regulate or control the amplitude of rolling boil conditions detected in container 14.

The apparatus of FIG. 1 also includes alarm and display devices designated as 50 and 52 as may be necessary for the application where the invention is employed.

The invention disclosed in this patent may find application in a variety of embodiments. There are many process industries where knowledge or control of boiling conditions is needed. It has already been mentioned that there exists no satisfactory means to detect boiling in certain chemical rectors. A specific application disclosed in detail in this patent is a cooking appliance monitor and/or controller.

The boiling condition detector may be employed with a cooking program selector and a fuel flow or power level control device to simplify or automate the cooking process. This embodiment is depicted in FIG. 4, where liquid 16 is now water or some other liquid to be cooked, and container 14 is a cooking vessel. Waveguide 20 transmits acoustic energy from cooking vessel 14, past surface heating unit 12 to acoustic transducer 22, which is located inside the cooking appliance to prevent its interfering with ordinary cooking activities. The signals from transducer 22 are processed by amplifier and filter 24 and interpreted in the manner previously described by electronic circuit 49, one implementation of which was depicted in FIG. 1. Information of the present boiling condition is passed to control panel 60, where the cooking condition is compared to the program selected by the operator. Commands to increase or decrease the heating rate are given as needed to burner control 18, which in turn, controls the rate at which fuel or power is delivered to heating unit 12.

There are many types of food that may be cooked on a surface unit of a cooking appliance and many different situations in which the boiling detector and control system may be employed. One possible mode of operation would be used to steam, for example, fresh vegetables. To cook these products, the product and water are placed together in a covered cooking vessel. The water is heated to a full boil, and the heat source is lowered or turned off to allow the steam in the vessel to cook the product. The operator will program the cooking appliance controller to apply heat at a high rate until a full boil is detected the to lower or turn off the heat source. A second possible mode of operation would be used to cook, for example, certain soups and sauces that must be brought to a full boil then simmered for a time. When the operator selects this program, heat will at first be applied at high rate until a full boil condition is detected. Then the rate of fuel flow or power delivered to the heating unit will be reduced to allow the cooking product to cool to a simmer condition. Thereafter, the rate of fuel flow or power delivery will be continuously adjusted by the controller to maintain a "simmer" condition in the cooking product--typically indicated by about one to ten acoustic emission events per second. This particular program employs two detection and control modes: a discrete control made while the product is initially heating and the controller is awaiting a full-boil signal from the detector, and a linear control mode while the controller seeks to maintain a constant rate of acoustic emission events during the simmer stage. This second mode of operation may also be beneficial for cooking products such as sliced potatoes that are susceptible to "boiling over." If the heating rate is reduced when the product first comes to a full boil, then the product will continue to cook, but the possibility of boiling over will be greatly reduced. A third possible mode of operation would be used to cook, for example, pasta, where the water must be brought to a boil before the food is placed in the cooking vessel. In this mode of operation, heat will be applied at a fast rate; and, when a full boiling condition is detected, an audible or visual alarm will be activated to alert the operator that the food may be placed in the cooking vessel.

These examples illustrate various ways that the several functions of the boiling condition detector can be used with a control system and a controllable heat source of a cooking appliance to simplify and to automate certain cooking tasks. As there are many food products that are not mentioned here, there remain many control programs where the boiling condition detector can be employed that are not described here.

Furthermore, there are a large number of processes in industry where boiling must be monitored or controlled, and the present invention may find application in many of them. In the particular application of cooking discussed here, as in most boiling applications, the rate of boiling is controlled by the rate at which heat is delivered to the liquid. There are, however, certain processes where boiling is caused, not by the introduction of heat to a liquid, but by the application of a vacuum. The boiling condition detector can be employed as well as a feedback sensor for a boiling control system where the boiling rate is controlled by pressure or vacuum. There are also certain exothermic chemical reactions where boiling of the reactants is caused by the heat of reaction, the progress of which can be monitored by an acoustic boiling condition detector.

The computer designated 40 in FIG. 1 and the control system designated 60 in FIG. 4 may in practice share a common microprocessor chip, or the boiling condition sensing circuit designated 49 in FIG. 4 and the control system 60 may be manufactured as a single electronic circuit. The functions have been separated in the block diagram of FIG. 4 to clarify the presentation and not to restrict the implementation of the invention.

We claim:

1. In combination with a vessel containing a liquid that is expected to boil where the condition of boiling is desired to be known, detection apparatus comprising:
    (a) transducer means for producing an electric signal correlated to individual random acoustic events occurring within the liquid contained in the vessel; and
    (b) circuit means for receiving said transducer means signal, identifying groups of acoustic events from bursts of signal activity which correspond directly to individual acoustic event occurrences, determining the rate of group acoustic event occurrence, and classifying said determined rate into one of different output signals, said different output signals being generated by said circuit means in response to different detected degrees of individual random acoustic events occurring in said liquid contained in said vessel.

2. The apparatus defined by claim 1 wherein said circuit means different output signals include a "not boiling" output signal, said "not boiling" output signal being generated when said circuit means determines that the signal from said transducer means is indicative of there being an average of less than approximately one detected group of acoustic events per second occurring in said liquid.

3. The apparatus defined by claim 1 wherein said circuit means different output signals include a "subcooled boiling" output signal, said "subcooled boiling" output signal being generated when said circuit means determines that the signal from said transducer means is indicative of there being multiple but discretely identifiable acoustic events occurring in said liquid, said events occurring at an average rate in the range of approximately 1 to 10 events per second.

4. The invention defined by claim 3 wherein said circuit means produces a "subcooled boiling" output signal that is approximately linearly proportional to the number of acoustic events per second occurring in said liquid, as detected from said transducer means signal.

5. The invention defined by claim 1 wherein said circuit means different output signals include a "full boiling" output signal, said "full boiling" output signal being generated when said circuit means determines that the signal from said transducer means is indicative of overlapping individual random acoustic events occurring in said liquid continuously or nearly continuously.

6. The invention defined by claim 5 wherein said "full boiling" output signal is approximately linearly proportional to the root-mean-square amplitude of the electrical signal from said transducer means.

7. The invention defined by claim 1 wherein said circuit means is responsive to transducer means electrical signals occurring only in a particular frequency range, said particular frequency range extending from approximately 5 kHz to approximately 50 kHz.

8. In combination with a vessel containing a liquid that is expected to boil where the condition of boiling is desired to be known, process control apparatus comprising:
    (a) heating unit means for applying heat to the vessel and responsive to different control signals to apply correspondingly different rates of heat into the vessel,
    (b) transducer means for producing an electric signal correlated to individual random acoustic events occurring within the liquid contained in the vessel; and
    (c) circuit means for receiving said transducer means signal, identifying groups of acoustic events from bursts of signal activity which correspond directly to individual acoustic event occurrences, determining the rate of group acoustic event occurrence, and classifying said determined rate into one of different control signals transmitted to said heating unit means, said different control signals being generated by said circuit means in response to different detected degrees of individual random acoustic events occurring in said liquid contained in said vessel.

9. The apparatus defined by claim 8 wherein said circuit means different control signals include a "not boiling" control signal, said "not boiling" control signal being generated when said circuit means determines that the signal from said transducer means is indicative of there being an average of less than approximately one detected group of acoustic events per second occurring in said liquid.

10. The apparatus defined by claim 8 wherein said circuit means different control signals include a "subcooled boiling" control signal, said "subcooled boiling" control signal being generated when said circuit means determines that the signal from said transducer means is indicative of there being multiple but discretely identifiable groups of acoustic events occurring in said liquid, said events occurring at an average rate in the range of approximately 1 to 10 groups of acoustic events per second.

11. The invention defined by claim 10 wherein said circuit means produces a "subcooled boiling " control signal that is approximately linearly proportional to the number of acoustic events per second occurring in said liquid, as determined from said transducer means signal.

12. The invention defined by claim 8 wherein said circuit means different control signals include a "full boiling" control signal, said "full boiling" control signal being generated when said circuit means determines that the signal from said transducer means is indicative of overlapping individual random acoustic events occurring in said liquid continuously or nearly continuously.

13. The invention defined by claim 12 wherein said "full boiling" control signal is approximately linearly proportional to the root-mean-square amplitude of the signal from said transducer means.

14. The invention defined by claim 8 wherein said circuit means is responsive to transducer means electrical signals occurring only in a particular frequency range, said particular frequency range extending from approximately 5 kHz to approximately 50 kHz.

15. In a method of controlling the boiling condition of a liquid contained in a vessel that cooperates with a vessel heating means responsive to a feedback control signal to vary the rate of heat input to the vessel, the steps comprising:
   (a) detecting individual random acoustic events occurring in the contained liquid;
   (b) producing electric signals correlated to said detected individual random acoustic events;
   (c) identifying groups of acoustic events from bursts of signal activity which correspond directly to individual acoustic event occurrences;
   (d) determining the rate of acoustic event occurrence;
   (e) classifying said determined rates into one of different output signals;
   (f) generating a feedback control signal for said vessel heating means from said classified output signal; and
   (g) applying said feedback control signal to said vessel heating means to vary the rate of heat input to the vessel, different feedback control signals being generated when detected individual random acoustic events indicate different boiling conditions of the liquid.

16. The invention defined by claim 15 wherein said different feedback control signals include a "no boil" control signal, said "no boil" control signal being generated when said individual random acoustic events are detected at an average rate of less than approximately one group of acoustic events per second.

17. The invention defined by claim 15 wherein said different feedback control signals include a "subcooled boil" control signal, said "subcooled boil" control signal being generated when said individual random acoustic events are detected at an average rate of approximately 1 to 10 groups of acoustic events per second.

18. The invention defined by claim 15 wherein said feedback control signals include a "full boil" control signal, said "full boil" control signal being generated when said detected individual random acoustic events overlap in time and occur at an average rate that one event cannot be distinguished from the next and the occurrence of acoustic events appears to be a continuous process.

19. The invention defined by claim 15 wherein said produced electrical signals are band-pass filtered to include only a particular frequency range, said particular frequency range extending from approximately 5 kHz to approximately 50 kHz.

20. In a method of controlling a programmable cooking appliance having a heating unit that cooperates with a utensil containing a liquid capable of boiling, the steps comprising;
   (a) detecting individual random acoustic events occurring in the contained liquid;
   (b) producing electric signals correlated to said detected individual random acoustic events;
   (c) identifying groups of acoustic events from bursts of signal activity which correspond directly to individual acoustic event occurrences;
   (d) determining the rate of group acoustic event occurrence;
   (e) classifying said determined rate into one of different output signals; and
   (f) generating a feedback control signal for the cooking appliance heating until from said classified output signals, different feedback control signals being generated in response to different detected rates of individual random acoustic event occurrence that indicate different boiling conditions of the liquid.

21. The invention defined by claim 20 wherein said feedback control signals are generated also in response to commands for a prescribed cooking program.

22. The invention defined by claim 21 wherein one cooking program is to apply full heat by said heating unit to said cooking utensil until a "full boil" condition is detected in said liquid, then to activate a display that a "full boil" condition has been detected.

23. The invention defined by claim 21 wherein one cooking program is to apply full heat by said heating unit to said cooking utensil until a "full boil" condition is detected in said liquid, then to reduce the heat being applied to said cooking utensil.

24. The invention defined by claim 21 wherein one cooking program is to apply full heat by said heating unit to said cooking utensil until a "full boil" condition is detected in said liquid, then to reduce the heat being applied to said cooking utensil until a "subcooled boil" condition is detected in said liquid, then to adjust the heating rate of said heating unit to maintain a "subcooled boil" condition in said liquid.

25. The invention defined by claim 21 wherein one cooking program is to apply full heat to said cooking utensil until a "full boil" condition is detected in said liquid, then to adjust the heating rate of said heating unit to maintain a "full boil" condition in said liquid for a prescribed period of time, then to adjust the heat unit and activate a signal that the boiling procedure has concluded.

26. The invention defined by claim 21 wherein one cooking program is to apply heat at a moderate rate to said cooking utensil until a "subcooled boil" or "simmer" condition is detected, then to adjust the heating rate of said heating unit to maintain a "subcooled" or "simmer" boiling condition in said liquid.

* * * * *